(12) United States Patent
Rippl et al.

(10) Patent No.: US 8,367,970 B2
(45) Date of Patent: Feb. 5, 2013

(54) LASER MACHINING WITH LASER POWER CONTROLLED AS A FUNCTION OF LASER MOTION

(75) Inventors: Peter Rippl, Augsburg (DE); Johann Hesse, Augsburg (DE); Anton Englhard, Petersdorf/Schönleiten (DE)

(73) Assignee: Kuka Systems GmbH, Augsburg (DE)

( * ) Notice: Subject to any disclaimer, the term of this patent is extended or adjusted under 35 U.S.C. 154(b) by 1598 days.

(21) Appl. No.: 10/598,622

(22) PCT Filed: Mar. 8, 2005

(86) PCT No.: PCT/EP2005/002438
§ 371 (c)(1), (2), (4) Date: Sep. 6, 2006

(87) PCT Pub. No.: WO2005/087427
PCT Pub. Date: Sep. 22, 2005

(65) Prior Publication Data
US 2007/0199929 A1    Aug. 30, 2007

(30) Foreign Application Priority Data
Mar. 9, 2004   (DE) .................. 10 2004 011 769

(51) Int. Cl.
*B23K 26/02*   (2006.01)
*B23K 26/08*   (2006.01)

(52) U.S. Cl. ......... 219/121.78; 219/121.82; 219/121.81; 219/121.79

(58) Field of Classification Search ............. 219/121.82, 219/121.67, 121.68, 121.69, 121.8, 121.81, 219/121.6, 121.85, 121.63, 121.64, 121.78, 219/121.79; 901/42; *B23K 26/08*
See application file for complete search history.

(56) References Cited

U.S. PATENT DOCUMENTS

| 4,831,316 | A  | * | 5/1989  | Ishiguro et al. | ............... 700/254 |
| 4,907,169 | A  | * | 3/1990  | Lovoi            | ............. 700/259 |
| 5,012,069 | A  |   | 4/1991  | Arai             |                         |
| 5,245,682 | A  | * | 9/1993  | Ortiz, Jr.       | ............ 385/33   |
| 5,267,683 | A  | * | 12/1993 | Hamada et al.    | ............. 228/4.1 |
| RE34,597  | E  | * | 5/1994  | Akeel            | ............. 219/121.78 |
| 6,100,497 | A  | * | 8/2000  | Maruyama et al.  | ...... 219/121.63 |
| 6,486,436 | B1 | * | 11/2002 | Shah et al.      | ............. 219/121.82 |
| 6,555,784 | B2 | * | 4/2003  | Iehisa et al.    | ............. 219/121.76 |

(Continued)

FOREIGN PATENT DOCUMENTS

| DE | 4335367 A1  | 4/1994 |
| DE | 10335501 A1 | 2/2004 |

(Continued)

*Primary Examiner* — M. Alexandra Elve
(74) *Attorney, Agent, or Firm* — McGlew and Tuttle, P.C.

(57) ABSTRACT

A method and device (1) for laser machining vehicle bodies or body parts (2) uses a laser beam (14) that is guided from a laser source (13) to a remote laser tool (15) on a robot hand by a guiding device (16). The robot (4) maintains the laser tool (15) in a suspended manner over the tool (2), at a focal length (F) and at a contact free distance and guides it along a machining path (30). The laser beam (14) is deviated, by movement of the hand axis (IV, V, VI), about a variable deviation angle (α), and the laser source (13), whose power is variable, is controlled according to the movement of the laser beam. The beam deviation of the hand axis (IV, V, VI) can be superimposed on an offset movement of the robot (4).

26 Claims, 7 Drawing Sheets

U.S. PATENT DOCUMENTS

| | | | |
|---|---|---|---|
| 6,603,092 B2 * | 8/2003 | Briand et al. | 219/121.64 |
| 6,888,096 B1 * | 5/2005 | Hamada | 219/121.7 |
| 6,974,930 B2 * | 12/2005 | Jense | 219/121.8 |
| 2001/0042737 A1 | 11/2001 | Iehisa et al. | |
| 2003/0192867 A1 | 10/2003 | Yamazaki et al. | |
| 2008/0000886 A1 * | 1/2008 | Bell et al. | 219/121.68 |

FOREIGN PATENT DOCUMENTS

| | | |
|---|---|---|
| DE | WO 2005/030427 A1 | 4/2005 |
| EP | 1038640 A2 | 9/2000 |
| FR | 2663583 | 12/1991 |
| JP | 5138374 | 6/1993 |

\* cited by examiner

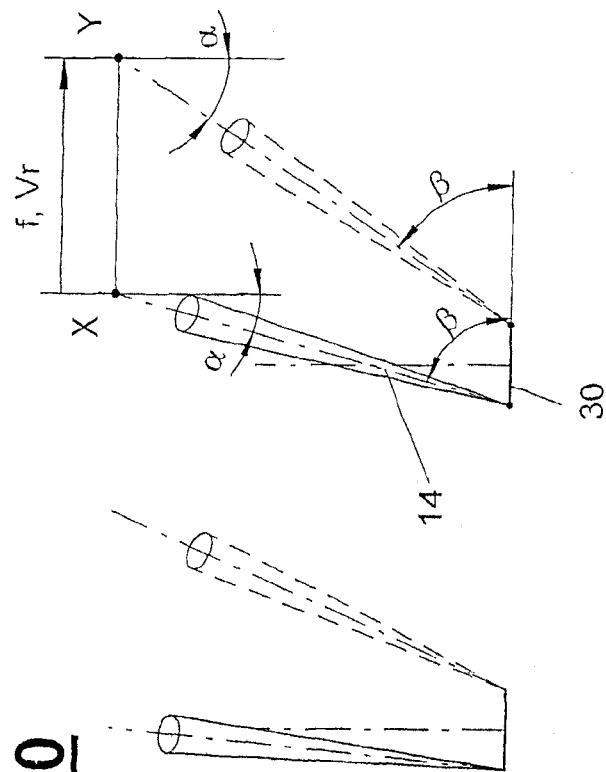
Fig. 10
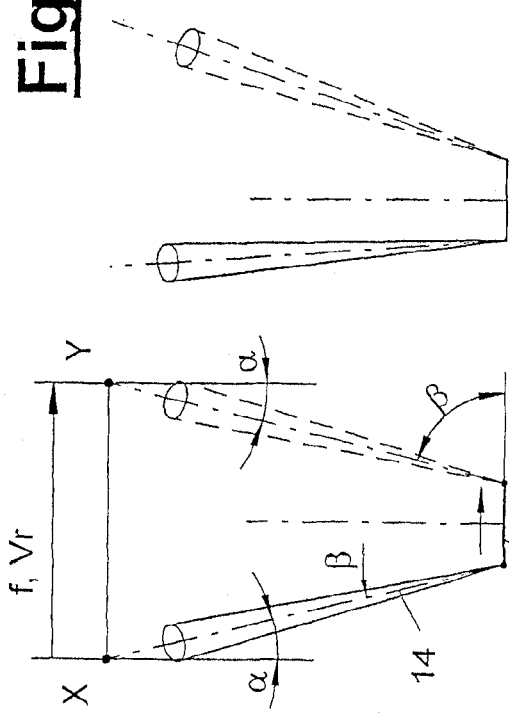
Fig. 11
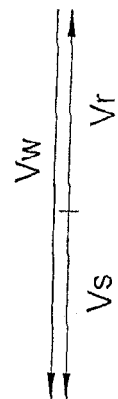
Fig. 12
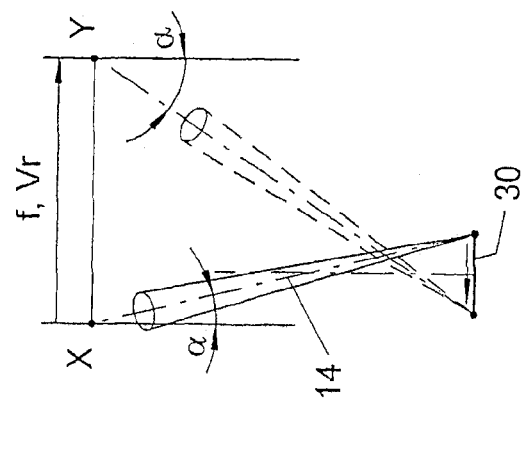

LASER MACHINING WITH LASER POWER CONTROLLED AS A FUNCTION OF LASER MOTION

CROSS REFERENCE TO RELATED APPLICATIONS

This application is a United States National Phase application of International Application PCT/EP2005/002438 and claims the benefit of priority under 35 U.S.C. §119 of German Priority 10 2004 011 769.1 filed Mar. 9, 2004, the entire contents of which are incorporated herein by reference.

FIELD OF THE INVENTION

The present invention pertains to a method for laser machining and to a laser device.

BACKGROUND OF THE INVENTION

Such a laser machining method along with a laser device for the laser welding of vehicle bodies is known from DE 103 35 501 A1. A laser beam is guided from a laser source via a guiding means to a remote laser tool at a multiaxial hand of a manipulator and directed towards a workpiece. The manipulator now moves the remote laser tool at a contact-free distance floatingly over the workpiece along a machining path. The laser beam can be deflected here via a scanner optical system integrated in the laser welding tool with movable mirrors. The manipulator, here a multiaxial industrial robot, is connected to a robot control, which controls the axes of the robot and the robot hand.

DE 43 35 367 A1 shows a multiaxial industrial robot, in the robot hand of which a laser welding means is integrated. The laser welding means has a sensor for detecting process-relevant signals from the machining zone, wherein the sensor is connected to a process control or regulator for the laser power.

Furthermore, it is known from practice that an industrial robot guides a laser welding tool by means of a pressing device in contact over the workpiece. All robot and hand axes equally participate in the guiding motion. The laser tool is moved at a constant angular velocity in relation to the workpiece and oriented, and the laser beam always meets the workpiece surface essentially perpendicularly. Conventional Nd-YAG lasers or $CO_2$ lasers, which operate with predominantly constant power and can optionally be controlled, are used as laser sources. Only limited welding speeds can be reached with the prior-art technique. In addition, the laser welding technique is suitable in weld deposit stations and for welding long, uninterrupted weld seams only. Another problem lies in the fact that the robot path for guiding the laser tools and the welding parameters must be tested and programmed or taught by the operator on the site himself.

Furthermore, it is known in the area of the surface machining and especially engraving of workpieces that stationary laser tools with a scanner optical system comprising movable mirrors for deflecting and guiding the laser beam can be used.

SUMMARY OF THE INVENTION

The object of the present invention is to provide a better laser welding technique.

The present invention accomplishes this object with a laser machining method and a laser device providing a substantially higher rate of machining, especially rate of welding, and correspondingly shorter cycle times. The cycle time is the sum of the times for one welding task and the reorientation for the next welding task. This increases the economy and makes it possible to carry out substantially more machining operations, especially welding processes or welding tasks with fewer devices on the workpiece within a predetermined cycle time. Moreover, the laser technique is suitable for any laser machining method, and laser cutting or other laser processes are also possible, besides the preferred laser welding.

Another special advantage is in the possibility of universal use of the laser technique, which is especially suitable for tacking loosely pretensioned body parts in a shaping geo station or framing station. In particular, the shape of the seam is freely selectable, and stitch seams, continuous seams or pendular seams with lateral deflection can be welded.

Due to the deflection of the laser beam by means of a motion of the hand axis, it is possible to reach very high velocities of motion of the laser beam and correspondingly high rates of welding. In addition, such a deflection of the laser beam can be controlled and monitored especially easily. This is simpler than deflection of the laser beam by means of scanner optical systems integrated in the laser tool with movable mirrors. The motion of the hand axis can, moreover, be carried out faster, more accurately and in a more controlled manner than motion of a mirror. Furthermore, the entire mirror technique can be done away with.

The other robot axes can be essentially at rest during the motions of the hand axes for deflecting the laser beam or perform only a height-adjusting motion of the hand and of the laser tool, which is due to the deflection angle. Height adjustment is frequently unnecessary in case of long focal distances of 300 mm or more. In addition, great focal distances at equal pivot angles make it possible to prepare longer weld seams with an essentially stationary manipulator or robot.

As an alternative, the manipulator can perform a displacing motion with its hand, which is superimposed to the motion of the hand axis. As a result, it is possible to obtain especially long machining paths or welding paths, which may also extend in space as desired. The manipulator may now perform an especially continuous displacing motion, which is especially favorable for the load and is advantageous for attaining high rates of welding. The desired and especially the optimal rate of machining and welding can be achieved on the workpiece in the superimposition of the velocity and orientation due to an at least partially opposite deflection of the laser beam and corresponding motion of the hand axis. The seam can be welded optionally in the direction of or opposite the direction of the displacing motion. Moreover, the laser beam can be laterally deflected from the actual course of the path by the motions of the hand axis in order to make it possible to weld seams of any desired shape. In addition, incidence angles favorable for the welding process can be obtained, and it is possible to obtain, in particular, a piercing beam incidence.

The laser source, whose power is variable and is controlled as a function of the motion of the laser beam, offers the advantage that the desired and especially the optimal section energy can be introduced at the workpiece during the laser machining. When the laser beam moves at a high velocity over the workpiece, the laser power can also be correspondingly high. In addition, the laser power can be controlled as a function of the angle of irradiation of the laser beam at the workpiece in order to account for the angle-dependent, different input coupling behavior of the laser beam. When interrupted seams or so-called stitch seams are formed, the laser power can also be switched off from time to time. Contrary to the state of the art, it is not necessary according to the invention to destroy any laser power. Fiber lasers, disk lasers or diode-pumped Nd-YAG lasers are especially suitable for use as laser sources with controllable power that can also be switched off.

Special technical and economic advantages arise when the laser source and the manipulator are controlled by a common control with a computer and memories for programs as well as at least one technology data bank. This control relieves the operator of the device and the machine operators of the hitherto very complicated programming operations, which can be carried out by skilled workers only. The operator only needs to input the data of the workpiece in the control, which will automatically determine and perform the necessary manipulator motions and laser process parameters on the basis of these data. The control generates the guide path to be followed by the laser beam and also the necessary orientations and deflections of the laser beam by correspondingly automatically determining the displacing motions of the manipulator and the motions of the hand axis in a program-supported manner and storing them. Thus, the operator does not need to teach the manipulator any more, contrary to the state of the art. In addition, the laser process parameters and especially the necessary power control data of the laser source are determined and set automatically corresponding to the motion of the laser beam.

The workpiece data are input by the operator in the control manually, via a replaceable data storage medium or also by telemetry via a data line. Even fully automatic operation is possible in case of telemetry. The laser technique being claimed offers an essential relief of the operators due to the high comfort of operation and makes possible the use of less qualified operators or even the extensive elimination of the need for operators.

Due to the high degree of integration, the laser technique can be used in a short time with only little effort at a worksite, especially in a robot cell or a complete production line. The laser technique with the machining method and the laser means can be made available as a complete function package to the plant operator, who can thus work fast without great preparatory efforts. In particular, the laser technique can be integrated in existing production plants without problems and can also be used for converting or retrofitting existing cells or stations.

A tooling may also be integrated and preferably connected to the common control for completing the laser technique. This may comprise a great variety of tools for the vehicle bodies or other workpieces. These may be, e.g., clamping tools for tensioning body parts to be welded together in the correct position or a conveying means for changing and exactly positioning the tools.

The possibilities of the laser technique being claimed can be utilized especially well when using multiaxial manipulators with multiaxial hands, especially articulated arm robots with six or more axes. As a result, the best flexibilities and the largest working areas can be obtained. Moreover, long focal distances of the laser tools are favorable for making it possible to generate long machining paths and for reaching large workpiece areas by small and rapidly controllable motions of the hand axes. In addition, fewer manipulators and laser tools are needed for machining the workpieces than before due to the high process speeds. This considerably reduces the installation costs and improves, moreover, the mutual interference problems of the devices used.

The laser means can, moreover, be expanded as desired by the use of a plurality of manipulators or robots with laser tools, and it is possible to maintain a single and common laser source by means of a corresponding switching technique, which entails considerable savings because of the cost of laser sources. The common control can be used universally.

The various features of novelty which characterize the invention are pointed out with particularity in this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 10 is a schematic diagram showing a variant of the motion of the laser beam at the workpiece;

FIG. 11 is a schematic diagram showing another variant of the motion of the laser beam at the workpiece; and FIG. 12 is a schematic diagram showing a variant of the motion of the laser beam at the workpiece.

DESCRIPTION OF THE PREFERRED EMBODIMENTS

Figure 1:
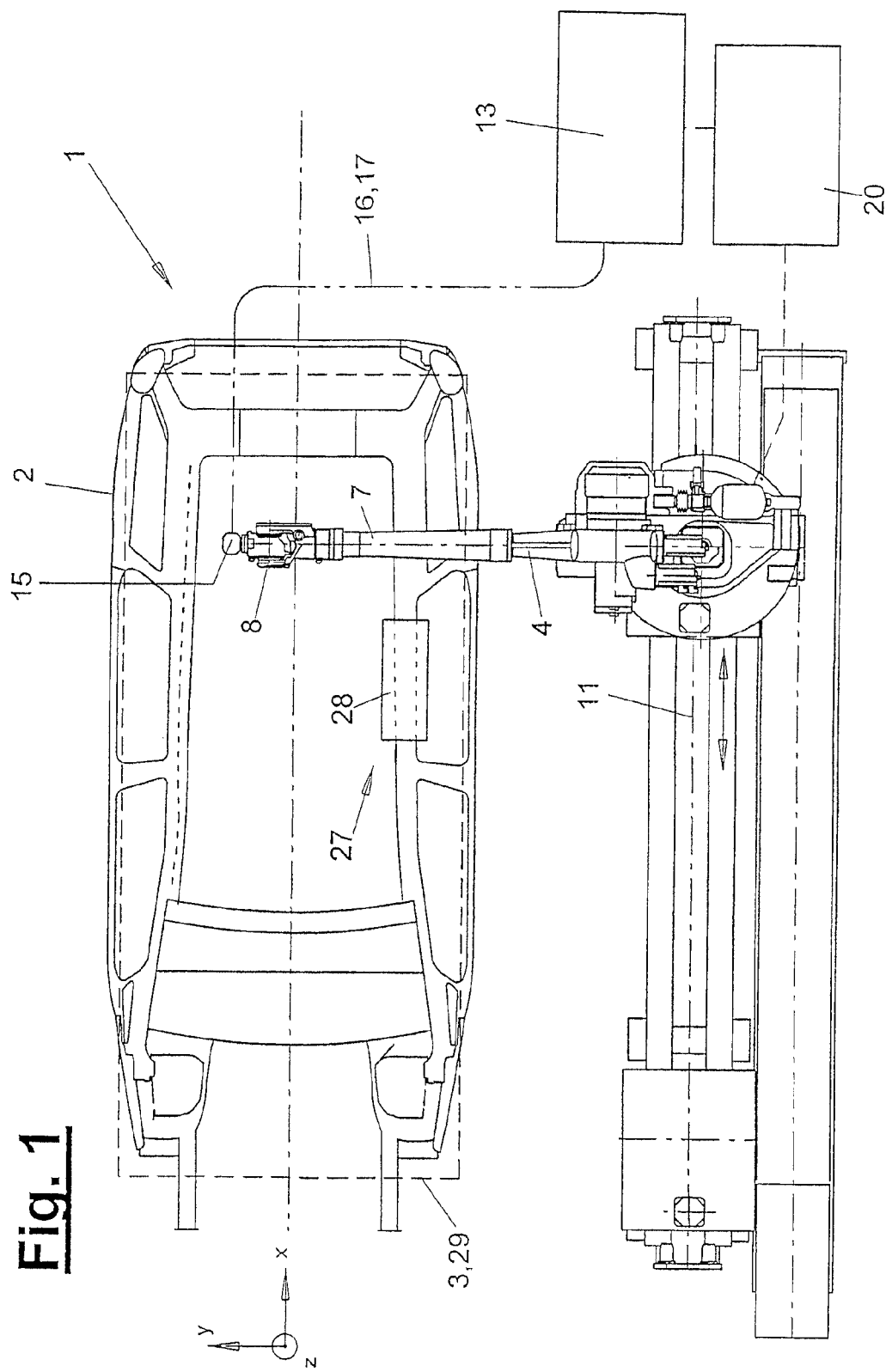
FIG. 1 is a top view of a laser means with a manipulator, with a laser tool and with a laser source.
Figure 2:
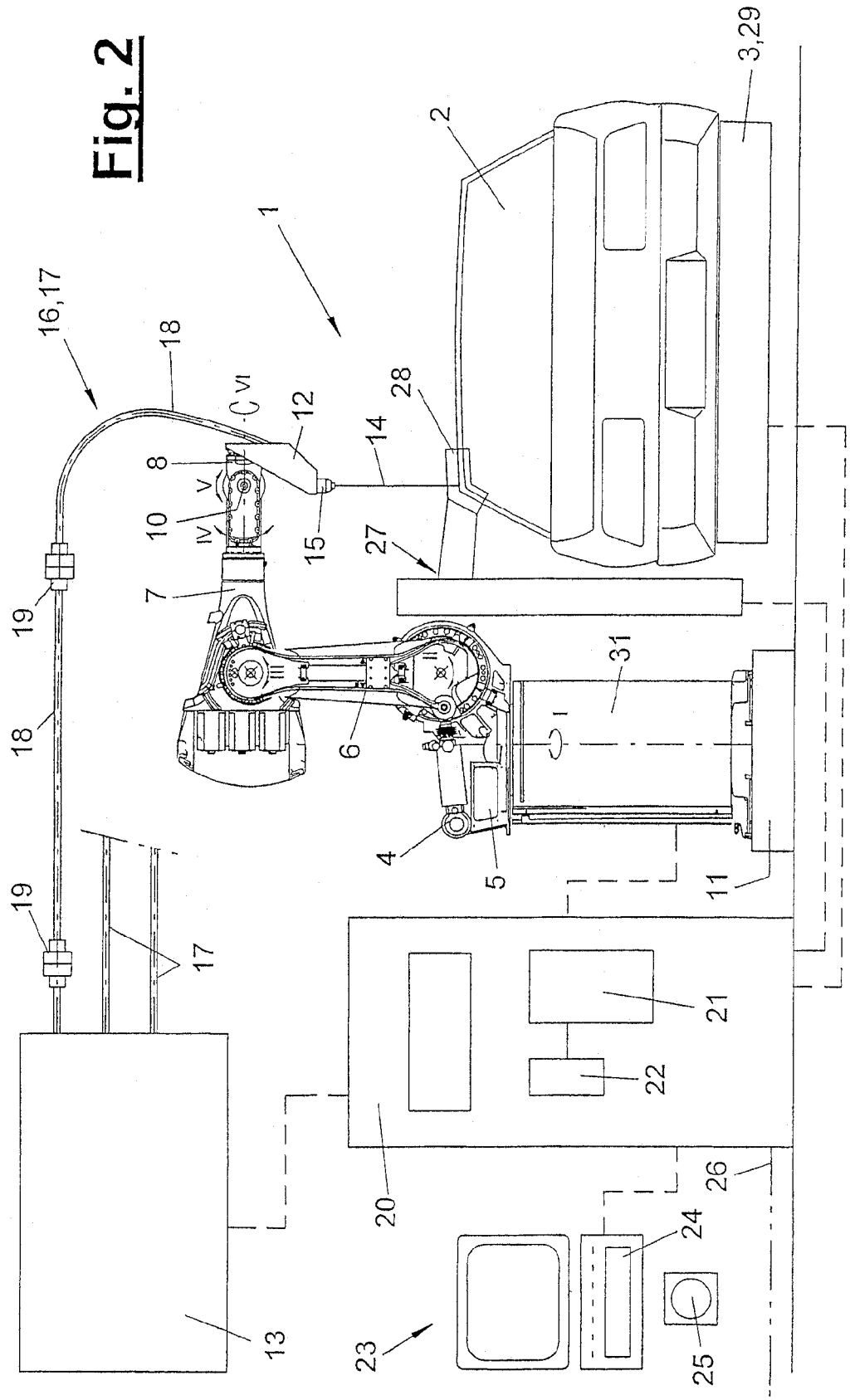
FIG. 2 is a side view of a laser device.
Figure 3:
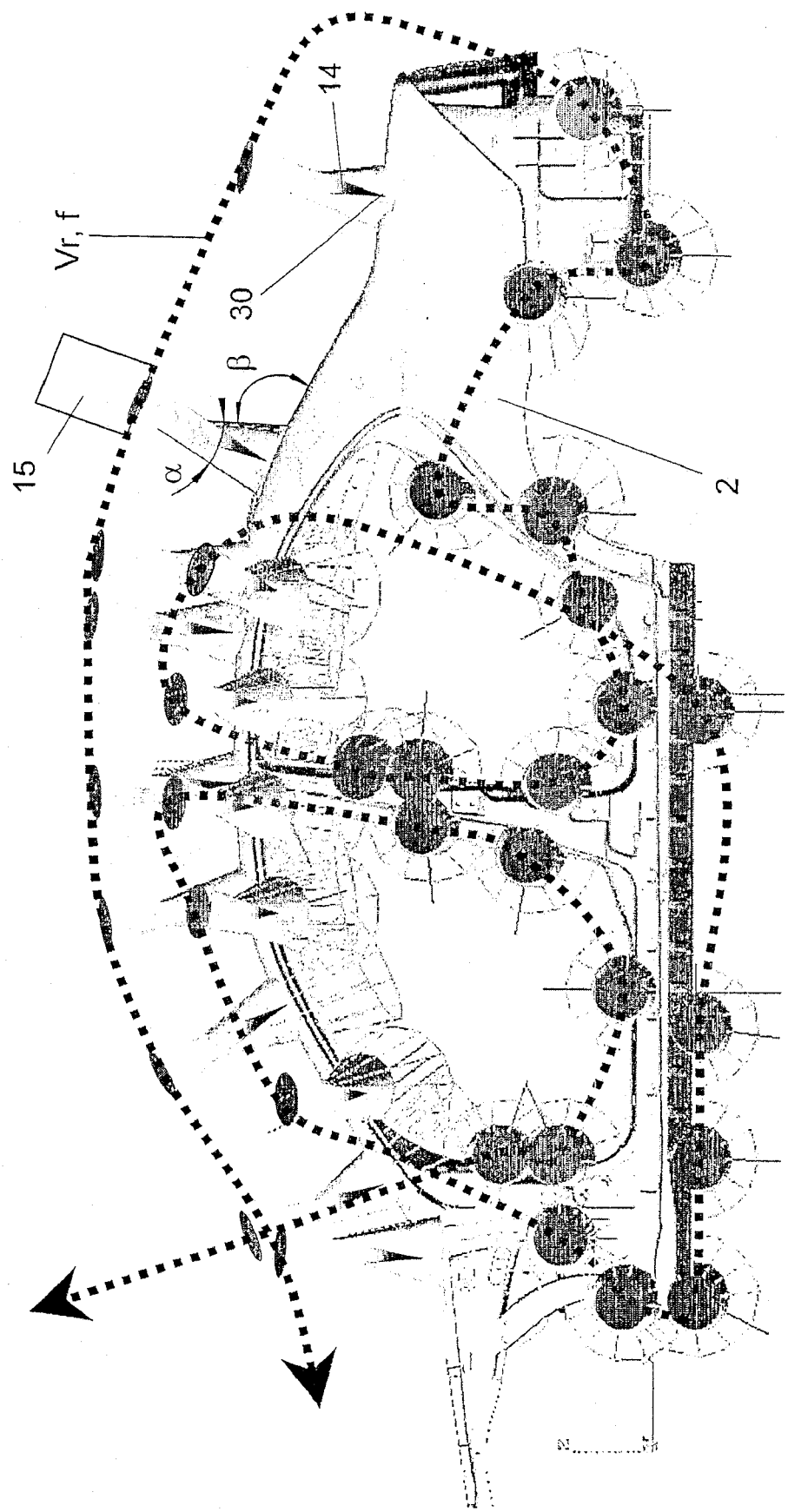
FIG. 3 is a side view of a vehicle body with the necessary welding areas and the corresponding guide path of the laser tool and of the manipulator.

Referring to the drawings in particular, FIGS. 1 and 2 show side views and front views of the general design of a laser means (1) in a schematic top view. The laser means (1) may be part of a machining station in the form of an independent cell or station in a production line. Furthermore, a plurality of laser means (1) may be present in the station. In the embodiment being shown, it is, for example, a geo station or framing station in body framing and paneling, in which the initially loosely clamped body (2) receives its final shape. As an alternative, the station may also be designed as a weld deposit station or a respot station. Furthermore, use in production cells for body parts, e.g., side panels or the like, is also possible. In general, the laser means (1) can be used in any desired environment and used to machine any desired workpiece (2), the latter preferably being vehicles bodies or body parts thereof.

The laser means (1) comprises at least one manipulator (4) with a laser tool (15), with a laser source (13) and with a guide means (16) for transporting the laser light from the laser source (13) to the laser tool (15). Furthermore, the laser means (1) may also have a common control (20) for the manipulator (4) and the laser source (13). In addition, a so-called tooling (27), which may likewise be connected to the control (20), may be a part of the laser means (1).

The manipulator (4) may be of any suitable design and carries at its front end a multiaxial hand (8). In the preferred embodiment being shown, it is a six-axis articulated arm robot, which may also have one or more auxiliary axes (11), e.g., the linear travel axis shown in FIGS. 1 and 2. The robot (4) may be arranged at the bottom of the plant, at a portal (not shown), at a side wall or another suitable site.

The articulated arm robot (4) comprises a frame (31), on which a bracket (5) is mounted rotatably about a first axis of rotation I. A rocker (6) is mounted on the bracket (5) pivotably about a pivot axis II extending at right angles, and an extension arm or robot arm (7) is in turn mounted pivotably at the other end of the rocker via a third, transversely extending pivot axis III. The robot hand (8) with its three axes of rotation and pivot axes IV, V, VI is arranged at the end of the extension arm or robot arm. The three hand axes IV, V, VI preferably intersect at a common intersection (10) and are directed at right angles to one another.

As an alternative, the manipulator (4) may have a simpler design and be provided with fewer axes. It may be, e.g., a linear unit with two translatory axes in the manner of a cross slide. Furthermore, manipulator forms with a combination of linear and rotatory axes are possible. The hand (8) has at least two mutually intersecting hand axes in these cases as well.

The laser tool (15) is preferably designed as a remote laser tool, which has a focal distance F and is guided by the manipulator (5) floatingly above the workpiece (2) at a contact-free distance along a machining path (30). There is no contact between the laser tool (15) and the workpiece (2), and pressing rollers and other similar guide means are eliminated as well. The focal distance F determines the working distance of the laser tool (15) from the workpiece (2) and preferably equals more than 300 mm and especially 500 mm to 1,500 mm or more.

The focal distance F may be fixed. As an alternative, it may be variable and switched, e.g., by a revolver type optical head or by changing the laser optical system or it can be adjusted by means of a displaceable linear unit (focal adjustment means).

The laser tool (15) is arranged on the rotatory driven flange (9) of the hand (8) in a suitable manner. In the preferred embodiment being shown, an extension arm (12) is used for this purpose, which extends from the driven flange (9) obliquely in the rearward direction and in the downward direction, as a result of which the laser tool (15) mounted at the lower end of the extension arm intersects the intersection (10) with the rearwardly extended axis of action of the laser beam (14). The extension arm (12) is designed, e.g., as a frame-like housing and extends with its side walls around the hand (8) and the laser tool (15) on both sides.

As an alternative, the extension arm (12) may also have a different design and extend, e.g., in the longitudinal direction of the last hand axis VI. Furthermore, the extension arm (12) may be eliminated and the laser tool (15) may be fastened directly to the driven flange (9). The axis of action of the laser beam (14) also does not have to intersect the intersection (10).

The laser machining process may be of any desired type. It is preferably a laser welding process. However, it may also be a laser cutting process or another laser process. The laser technique will be described below with reference to a laser welding process, and the drawings can be correspondingly extrapolated to other laser machining processes as well.

Figure 4:
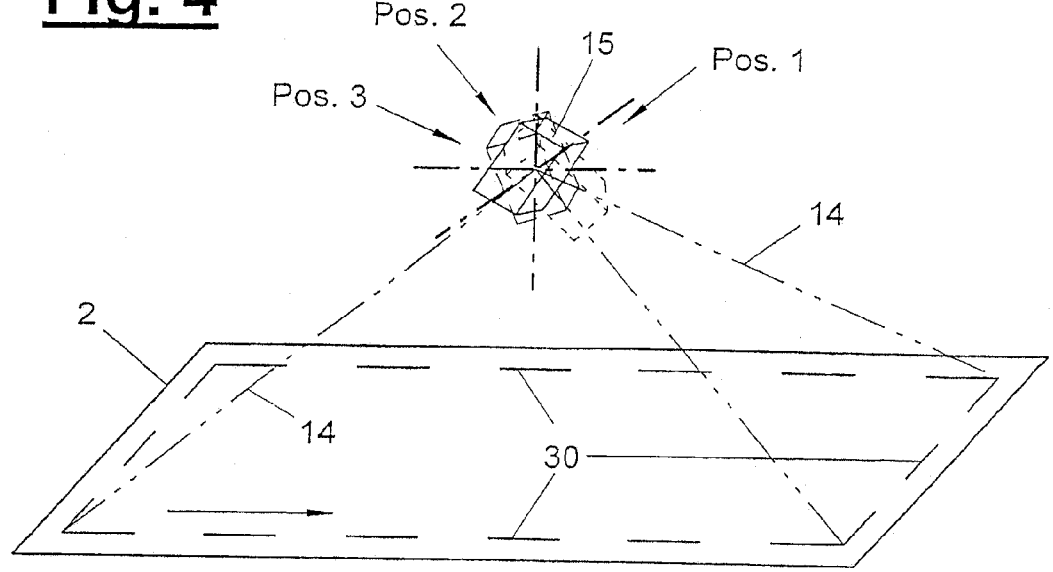
FIG. 4 is a simplified and perspective schematic view of a remote laser tool.
Figure 5:
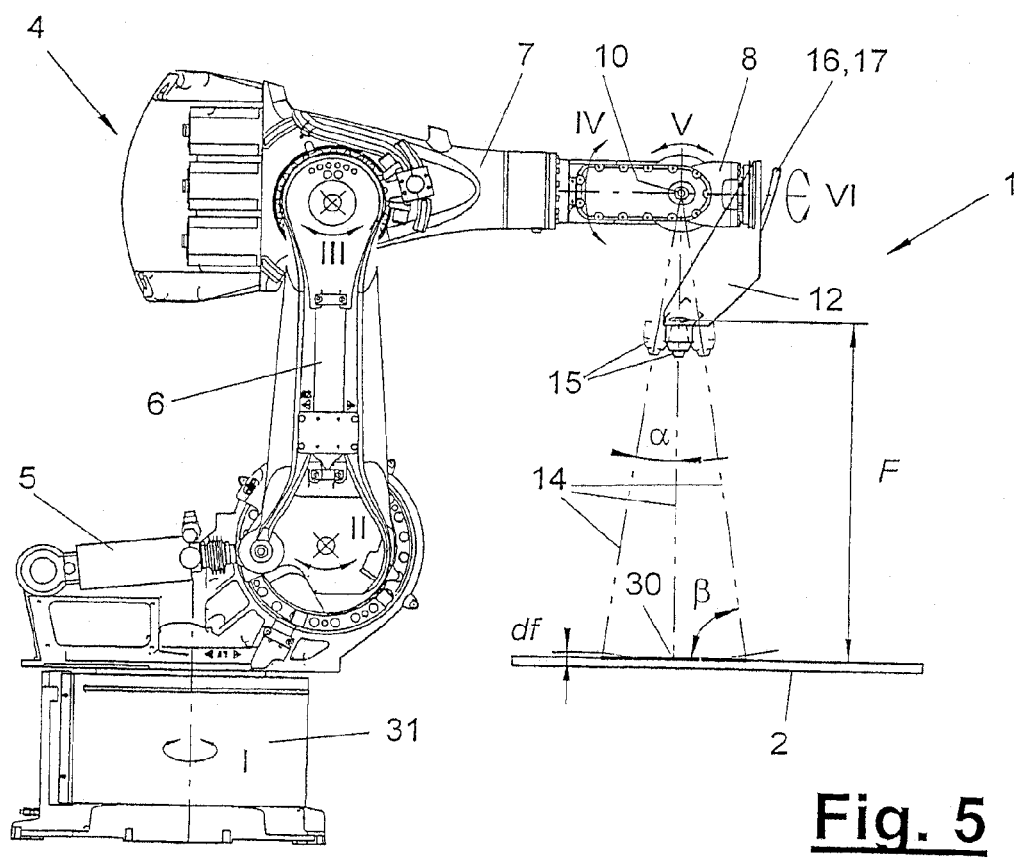
FIG. 5 is a more detailed and enlarged side view of the manipulator with the laser tool and with part of the workpiece.

For welding, the laser beam (14) is deflected essentially by a motion of the hand axes IV, V, VI by variable solid deflection angles α and moved over the workpiece (2) along a machining or welding path (30) determined and programmed in the control (20). FIGS. 4 and 5 illustrate the kinematics. The manipulator (4) holds the hand (8) by a corresponding actuation of its robot axes I, II, III such that the hand (8) is in the extended position at a spaced location above the workpiece area to be machined and is directed with its housing and with the driven axis VI essentially in parallel to this workpiece area.

In such a position, as it is shown, e.g., in FIGS. 2, 4 and 5 with a simplified flat workpiece (2), the laser beam (14) can be moved by rotary motions of the rotatory hand axes V and VI over the workpiece surface and deflected by the solid deflection angle α in the process. FIG. 4 schematically shows this possibility of motion, and a peripheral open or closed stitch seam is formed from offset, short laser stitch seams by superimposed motions of the hand axes at the edge of the sheet. In a variant of the exemplary embodiment, a rotary motion about the first hand axis IV may take place as an alternative or in addition to the last hand axis and driven axis VI. This applies at least to the extended position shown in FIG. 5.

The manipulator (4) may remain stationary with its other axes I, II, III during the motions of the hand axes. Any height deviations df (cf FIG. 5) caused by the deflection angle α and the corresponding arc-shaped path of the focal point or focal spot can be optionally compensated by an adjusting motion of the manipulator (5) with one or more of its axes I, II, III in order to always keep the focal point exactly on the workpiece surface. The height deviation df decreases in case of longer focal distances and it may also be tolerated without performing an adjusting motion depending on the requirements of the process.

In addition, the manipulator (4) may perform a displacing motion by means of its axes I, II, III between the individual machining or process sections, but also during the welding process, and optionally also by means of the first hand axis IV and guide the hand (8) and the laser tool (15) relative to the workpiece (2).

This displacing motion and the motion of the hand axes for deflecting the laser beam may be superimposed to one another. In particular, the manipulator (4) may perform a continuous displacing motion at an essentially constant velocity of displacement, and the superimposed beam deflection motion can be directed opposite this displacing motion at least partially. The beam deflection motion may be directed, in addition or as an alternative, at right angles to the displacing motion when the motions are superimposed. As a result, any desired seam form (30) can be obtained, as is illustrated in different examples in FIG. 9. The possibilities of variation apply especially to the shape, length and sequence of the individual seam sections as well as the overall three-dimensional shape of the seam (30), e.g., circles, spirals, angle sections, etc.

Figures 7, 8, 9:
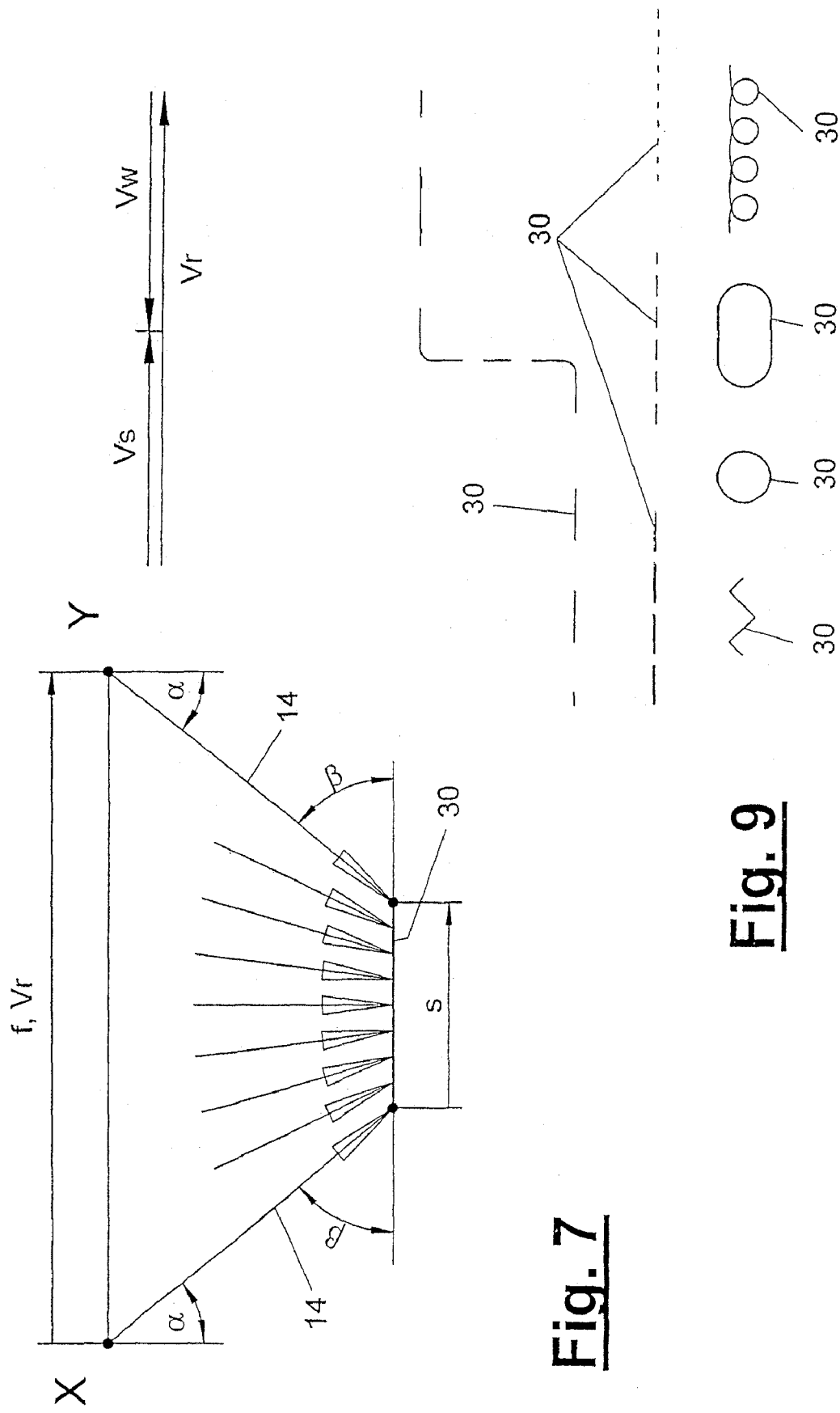
FIG. 7 is a schematic diagram of the motion of the laser beam at the workpiece.
FIG. 8 is a schematic view of the velocity superimpositions.
FIG. 9 is a view of different seam forms.

FIGS. 7 and 8 illustrate the above-mentioned superimposition of motions. In case of parallel orientation of the two motions, the displacing motion may take place, e.g., according to FIG. 8, at a high rate of displacement Vr, and the opposite deflecting motion generates a lower rate of deflection Vw. A rate of machining or welding Vs is obtained at the workpiece (2) at the machining path or the weld seam (30) due to the superimposition of the two motions directed opposite each other. Very high rates of welding Vs of 9 m/minute or more can be reached for laser remote welding with narrow bundling and high beam quality of the laser beam (14). The rate of displacement Vr and the rate of deflection Vw may be constant or variable.

Figure 6:
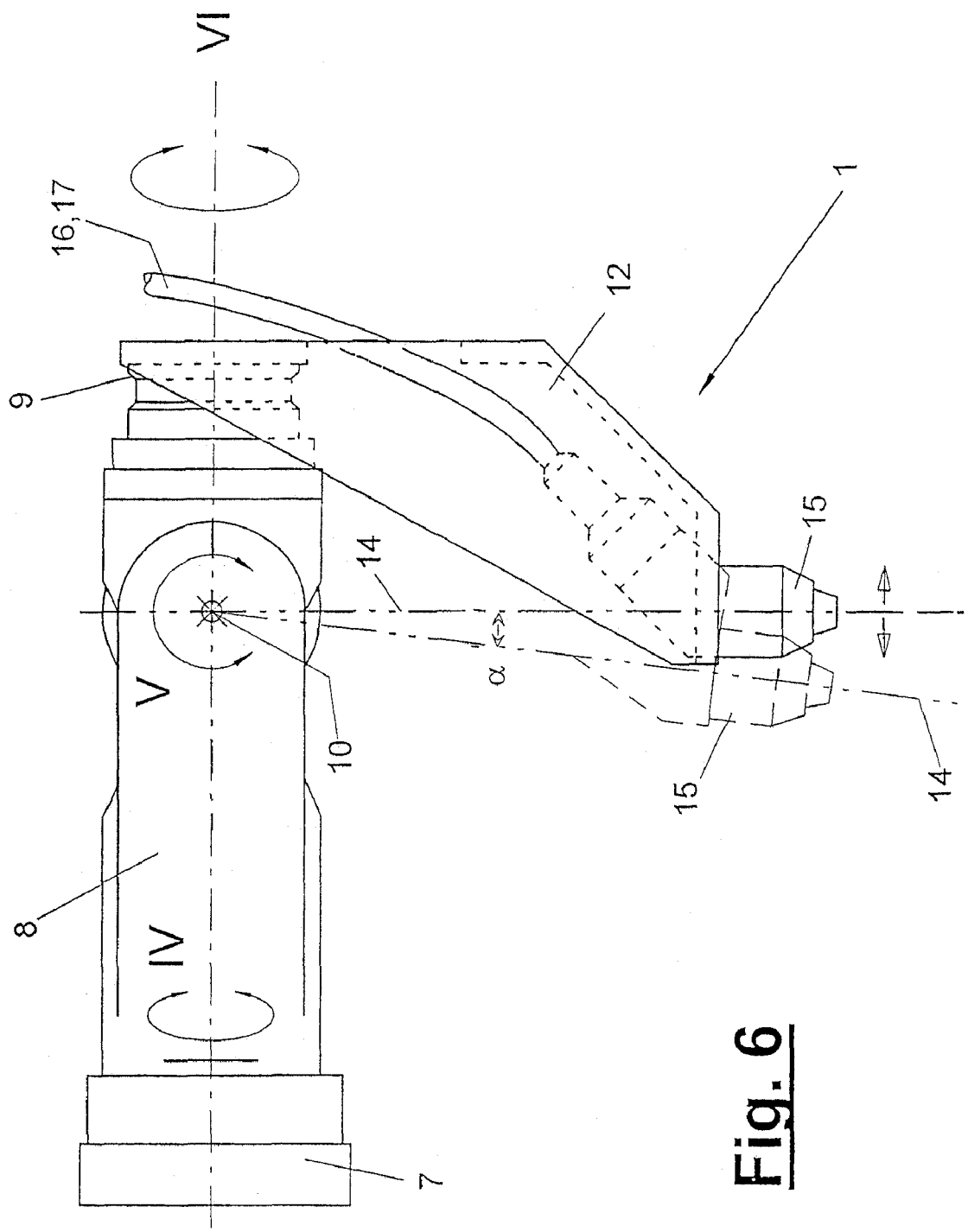
FIG. 6 is an enlarged side view of the hand, of an extension arm and of the laser tool.

The manipulator (4) may be moved essentially continuously and without interruptions or reversal of direction as well as without starts and stops, which reduces the loss times and increases the overall rate of the process. FIG. 7 explains for this the path ratios. The path of displacement f traveled by the manipulator (4) with its hand (8) and with the laser tool (15) is essentially parallel to and substantially greater than the machining or welding path s along the machining path (30) traveled on the workpiece (2) from the point of incidence of the laser beam (14). When, e.g., a stitch seam is prepared with a plurality of seam lines prepared one after another at mutually spaced locations, the welding process begins according to FIG. 7 already at a position X, at which the laser beam (14) is deflected by a motion of the hand axis about the angle α and is directly obliquely toward the workpiece (2). The deflection angle α is the solid angle by which the laser tool (15) with the laser beam (14) is deflected from the perpendicular or normal direction toward the workpiece surface. As is illustrated in FIGS. 5 and 6, the hand (8) is, moreover, preferably in its extended position in this initial position.

At the beginning of the laser welding process at point X, the laser beam (14) leads the hand (8) in the direction of the displacing motion and is directed obliquely towards the workpiece surface, and it falls on the workpiece surface at an incidence angle β. This orientation, in which the laser beam (14) is above the weld pool, is also called piercing beam incidence. The deflection angle α is reduced in the course of the path of displacement f, as a result of which the orientation of the laser beam (14) changes and the irradiation angle β increases correspondingly. The deflection angle α is approx. 0° and the irradiation angle β is approx. 90° approximately in the middle of the path of displacement f. The orientation of the beam changes beginning from this point, the deflection angle α becoming negative and its value increasing again. The irradiation angle β likewise becomes negative and its value decreases again. Beginning from the center, the laser beam (14) is directed by the laser tool (15) obliquely rearwardly, and the laser tool (15) overtakes the point of incidence of the laser beam on the workpiece and leads same. This orientation is also called trailing beam incidence.

At the end of the welding path s, the manipulator (4) leads by a large amount in its displacing motion and its path of displacement f at the end point Y. For the next seam section, the laser tool (15) is again reoriented with the laser beam switched off by a motion of the hand axis and it assumes the above-described positive deflection angle α in order to be again ready for the next welding process at the start point X.

This kinematics, described for a simple, flat workpiece and for a simple weld seam with straight seam lines, can also be extrapolated, with corresponding modifications, to more complicated conditions with, e.g., arched workpiece surfaces and a corresponding change in the displacing motion. The path of motion of the manipulator (4) is preferably programmed such for the displacing motion that the intersection (10) of the hand axes IV, V, VI is led over the workpiece (2) along a three-dimensional path of motion that follows the workpiece contour to be machined and the desired machining or welding path (30) at an essentially constant working distance.

FIGS. 10 through 12 show variants of the laser beam motion at the workpiece. The laser beam (14) is represented by solid lines at the beginning of the welding process and by broken lines at the end of the welding process.

In FIG. 7 and FIG. 10, the welding progresses on the workpiece with the same forward direction component as the displacing motion, which is indicated by an arrow at the seam section (30) in FIG. 10. The value of the rate of displacement Vr is greater than the opposite rate of deflection Vw.

A piercing beam incidence with positive deflection angle α is shown in FIG. 7 and in the first, left-hand part of FIG. 10 at the start point X.

When there are short distances between the seam sections in case of a stitch seam and the manipulator (4) has a high rate of displacement Vr, the time available for the reorientation of the laser beam from the trailing beam incidence at the end of a seam section to the beginning of the next seam section may become hardly sufficient. In such cases, but on other occasions as well, the laser beam (14) may fall more steeply and at a smaller deflection angle α at the beginning of the seam section, as this is illustrated in the second part of FIG. 10.

Trailing beam incidence with negative deflection angle α, which increases until the end of the seam, is possible even at the beginning of the seam. The incidence angle β retains its sign in these cases and decreases over the welding path. The third and fourth parts on the right-hand side of FIG. 10 show such a trailing beam incidence at the beginning and at the end of the seam section (30).

FIGS. 11 and 12 show another variant of laser beam deflection. The laser beam (14) is directed in this case toward the remote end of the seam section (30) at the beginning of the welding process at point X. There is at first a trailing beam incidence now with a positive deflection angle α. The laser beam (14) is oriented in the opposite direction over the course of the displacing motion so rapidly that the value of the rate of deflection Vw is greater than the rate of displacement Vr. The progression of welding takes place as a result opposite the displacing motion, which is indicated by an arrow pointing to the left in FIG. 11. Beginning from the perpendicular incidence angle β and until the end of the welding process, the laser beam (14), indicated by broken line, has again a piercing incidence with a negative deflection angle α. The seam forms shown in FIG. 9 can be formed with such backward-directed progression of welding. In addition, it is possible to weld scale-like seams, in which the laser beam (14) oscillates along the welding path several times forward and backward.

The laser source (13) may be of any desired and suitable type. Its power is variable and can be controlled, in particular, as a function of the motions of the laser beam. A common control (20) of the manipulator (4) and laser source (13) is preferably present for this. The laser source (13) is preferably designed as a fiber laser, disk laser or diode-pumped Nd-YAG laser. Such a laser source (13) can also be switched off briefly if necessary, which happens, e.g., in case of stitch seams between the individual seam sections. In addition, the value of the laser power of the laser source (13) can also be controlled as a function of the deflection angle α or the irradiation angle β. The coupling characteristic of the laser beam (14) depends on the irradiation angle β and is best in the range of approx. 90°. The laser power can be correspondingly reduced in this angle range. In case of smaller irradiation angles β, as they occur, e.g., in FIG. 7 at the start and end points X, Y, the coupling characteristic is poorer, and the laser power is correspondingly increased for compensation.

The laser means (1) makes it possible to control and optimize the section energy introduced by the laser beam (14) in the machining or welding path s. The laser means can also be controlled as a function of the velocity at which the point of incidence of the laser beam (14) is moving along the welding path (30) on the workpiece (2). This motion depends on the motion of the hand axes and the deflection of the laser beam as well as the optionally superimposed displacing motion. The higher the velocity of motion of the point of incidence, the higher can be the laser power. Conversely, the necessary laser power decreases with the velocity of motion. The section energy introduced can be controlled as a result in the desired manner and can be maintained, e.g., essentially at a constant value. Depending on the requirements of the process, it may, however, also vary in space and in time in order to account for differences in the thickness or the position of the workpiece. The velocity of motion of the point of incidence of the beam and the laser power coupled therewith can, moreover, vary over the welding path or weld length s.

The above-described different influencing variables for the laser power may be superimposed to one another and mutually affect each other. The necessary laser process parameters and especially the control data for the laser power can be input and stored herefor in a technology data bank as a function of the motion kinematics of the laser beam (14). The rate of displacement Vr, the path of displacement f, the rate of deflection Vw, the deflection angle α and the irradiation angle β, the focal distance F, optionally the working distance of the intersection (10) from the workpiece surface and the desired shape or course of the seam as well as possibly other data can be input as motion parameters for the laser beam (14).

The common control (20) contains at least one computer (21) with one or more connected memories (22), in which the above-mentioned technology data bank(s), on the one hand, and, on the other hand, at least one program, with which the displacing and hand axis motions to be performed by the manipulator (4) and the above-mentioned laser process parameters, especially the necessary laser power, are automatically determined and set during the welding process, run and optionally monitored as well as logged.

The determination is carried out on the basis of workpiece data, which are input in the control (20) via an input unit (23) on the site. These workpiece data contain, on the one hand, the desired one-part or multipart machining path (30). These may be data on the site, course and type or seam shape of the welding path (30) on the workpiece (2). Any seam shapes may be preset, as they are schematically shown, e.g., in FIG. 9. These may be especially stitch seams with a plurality of seam sections of any desired length and any desired spacing. As an alternative, continuous weld seams may be preset. As is illustrated in FIG. 9, it is, in addition, also possible to preset circular or ring seams, zigzag seams, scale-like seams by means of motion spirals following each other, etc.

The workpiece data include, furthermore, data on the material, surface finish, the number and mutual positions of the sheet metals in the process zone, and other similar data. These workpiece data also affect the laser power. It may also be necessary to place a plurality of thin weld seams next to each other or one on top of another or even broader weld seams. Broadening of the weld seams can be achieved, e.g., by deliberately selecting an offset between the focus of the laser beam and the point of incidence. The greater this offset in the positive or negative direction, the larger is the cross section of the beam at the point of incidence and the greater is the width of the weld seam, a correspondingly higher laser power being useful or necessary.

A program is stored in the control (20), and the program automatically calculates, on the basis of the above-mentioned workpiece data, the axis motions to be performed by the manipulator (4) and also the path of motion and guiding for the hand (8) as well as the intersection (10) and also the necessary motions of the hand axes for the beam deflection, stores same and presets them for the manipulator (4) as a programmed path. Moreover, monitoring and logging of the motions is possible here as well. Taking these motion data into consideration, the same program or another program can, moreover, calculate and store the necessary laser process parameters, especially the necessary laser power of the laser source (13) in the different process steps and along the machining path (30) and run them during the process. Thus, essentially only the workpiece data are to be input by the operator at the fully developed stage.

This input may be performed in various ways. FIG. 2 schematically shows different possibilities herefor. This may be, e.g., manual input by an operator via a keyboard (24) at an input station with a monitor. It is also possible to use other input devices, such as a mouse, a panel or the like. The workpiece data may be input, furthermore, via one or more changeable and portable data storage media (25) in connection with corresponding drives of the control (20). These may be, e.g., CDs, DVDs, tapes or the like. Furthermore, data transmission by telemetry by means of one or more data lines (26), e.g., also within a network, is possible. A cable connection, but also contactless telemetry by means of radio, infrared radiation or the like may be provided herefor.

The guide means (16) for the laser beam (14) may have any desired and suitable design. In the embodiment shown, it comprises a flexible fiber optic cable (17), which connects the laser source (13) to the laser tool (15). As an alternative, the guide means (16) may also consist of a beam guide provided with tubes, joints, telescopic sections and mirrors. Besides, any other desirable guide means are possible.

The guide means (16) is preferably of a modular design and comprises a plurality of conductor sections (18), which can be connected to one another by conductor couplings (19). This offers a kind of modular system and permits the guide means (16) to be adapted to the particular intended use and to form the particular necessary lengths and course of the guide means (16). The guide means (16) is highly flexible as a result.

A laser source (13) may supply a plurality of manipulators (4) and laser tools (15) together correspondingly via a plurality of guide means (16). This is symbolized in FIG. 2 by two additional conductor cables (17) shown schematically. The laser source (13) can be switched over now to the different guide means (16) and laser tools (15) via the control (20) and by means of a corresponding program. In addition, other laser tools, which are arranged, e.g., at clamping frames or the like, can be connected now. The laser energy and the laser beam (14) can also be switched in another way, e.g., by adjustable laser beam shunts or the like. It is possible in another variant to operate with a laser source (13) comprising a plurality of individual modules and to connect each module to a corresponding laser tool (15). Switching is also possible here as an alternative.

The laser energy is optimally utilized due to the switching mentioned. The laser power can be switched to another laser tool (15) that is ready for the process during the nonproductive times of the individual manipulators (4) and laser tools (15), during which, e.g., the laser tool (15) is locally displaced or reoriented. The laser power is switched back again to the first laser tool (15) after the end of the nonproductive time.

The tooling (27) mentioned at the beginning is schematically indicated in FIGS. 1 and 2. Just as the manipulators (4) and the laser source (13), it can likewise be connected to the common control (20) and acted on by same as a function of the process. As an alternative, the tooling (27) may be part of the station. The tooling (27) may comprise, e.g., one or more different tools. For example, a clamping tool (28), which comprises one or more and optionally movable and replaceable clamping frames with individual clamping tools attached thereto or other processing tools for the workpiece (2), is indicated for this in FIGS. 1 and 2. Furthermore, a switchable local protective gas supply at the workpiece (2), a smoke exhaust unit or the like may also belong to the tooling (27).

The tooling (27) may contain, furthermore, a workpiece holder (3) for the bodies or body parts (2) and optionally also a conveying means (29) for the workpiece holder (3) and/or the body/body parts (2). Such a conveying means (29) may have, moreover, a positioning means, with which the body or body parts (2) are brought to the correct position for the process and are fixed in that position. The conveying and the change of the bodies or body parts (2) may be brought about in any desired and suitable manner by means of corresponding stationary conveyors, such as roller conveyors or the like, but also by freely programmable conveyors, such as conveying robots, etc. These are likewise connected to the control (20).

Various modifications of the embodiments shown and described are possible. This applies, on the one hand, to the design and the arrangement of the manipulators (4) and of the laser source (13) as well as of the other components of the laser means (1). The laser tool (15), which may operate, e.g., by beam splitting with two or more laser beams (14), is variable as well. In addition, an automatic linear focus and height adjustment may be integrated in the laser tool (15). In addition, the laser tool (15) may operate with a bundle of a plurality of individual switchable laser beams in case of a corresponding design of the laser source (13) and of the guide means (16).

While specific embodiments of the invention have been shown and described in detail to illustrate the application of the principles of the invention, it will be understood that the invention may be embodied otherwise without departing from such principles.

The invention claimed is:

1. A process for the laser machining of a workpiece, the process comprising:
    sending a laser beam from a laser source via a guide means to a laser tool at a multiaxial hand of at least one manipulator, the laser tool having a focal distance;
    guiding, with said manipulator, said laser tool in a displacing motion relative to said workpiece at a contact-free distance above the workpiece along a machining path;
    deflecting said laser beam, means of a motion of said hand, to provide a deflection motion about one or more axes of the multiaxial hand by variable deflection angles and to change an angle of incidence of the laser beam on the workpiece; and
    controlling said laser source, whose power is variable, by controlling laser beam power of said laser source to control power of said laser beam at the laser tool as a function of laser beam motion and the angle of incidence of the laser beam on the workpiece, wherein the laser source and the manipulator are controlled by a common control.

2. A process in accordance with claim 1, wherein said beam deflection motion of said hand axes is superimposed to said displacing motion.

3. A process in accordance with claim 2, wherein said manipulator performs a continuous displacing motion, wherein said superimposed beam deflection motion is directed at least partially in a direction opposite to a direction of said displacing motion.

4. A process in accordance with claim 1, further comprising:
    providing one or more programs and at least one technological data bank, wherein said one or more programs and said data bank are used for providing said displacing motion of said manipulator and controlling said laser source automatically on a basis of input workpiece data; and
    providing a computer for running said one or more programs as part of a control and providing a control memory for storing said at least one technological data bank.

5. A process in accordance with claim 2, wherein said laser beam power of said laser source and said displacing motion and said beam deflection motion are determined and controlled according to a section energy to be introduced into said workpiece.

6. A process in accordance with claim 4, wherein said workpiece data are input by an operator into said common control on site via an input unit.

7. A process in accordance with claim 4, wherein one or more tools for said workpiece are controlled by said common control.

8. A process in accordance with claim 1, wherein said laser tool has a focal distance that may be switched from one focal distance to another focal distance or may be adjusted from one focal distance to another focal distance, and further comprising the step of:
    adjusting the focal distance of the laser tool as a function of laser beam motion and the angle of incidence of the laser beam on the workpiece.

9. A laser device for laser machining, including laser welding, of a vehicle body workpiece and a body parts workpiece, the device comprising:
    a manipulator;
    a laser source;
    a laser tool with a focal distance;
    a laser guide means for guiding laser light from the laser source to the laser tool, wherein the laser source is connected via said guide means to said laser tool at a multiaxial hand of said manipulator, wherein said manipulator holds said laser tool and guides same at a contact-free distance spaced from the workpiece along a machining path;
    a common control for controlling said manipulator for moving said laser tool in a displacing motion relative to said workpiece at a contact-free distance above the workpiece along a machining path and for deflecting said laser beam about hand axes such that said laser beam has a deflection motion by variable deflection angles to change an angle of incidence of the laser beam on the workpiece, and controlling power of said laser source to vary power at said laser tool as a function of laser beam motion and the angle of incidence of the laser beam on the workpiece.

10. A laser device in accordance with claim 9, wherein said manipulator guides said hand in said displacing motion relative to said workpiece, wherein said laser beam deflecting motion is superimposed to said displacing motion to provide a superimposed laser beam deflecting motion.

11. A laser device in accordance with claim 10, wherein said manipulator performs a continuous displacing motion, wherein said superimposed beam deflecting motion is directed at least partially opposite to a direction of said displacing motion.

12. A laser device in accordance with claim 10, wherein said common control has a input unit for inputting workpiece data by an operator on site.

13. A laser device in accordance with claim 12, wherein said common control has at least one said computer and at least one memory with one or more programs and with at least one technology data bank, with which program and data bank said displacing motion and said deflection motion and said laser process parameters can be automatically determined and carried out on a basis of input workpiece data.

14. A laser device in accordance with claim 9, wherein said common control controls power of said laser source and said displacing motion and said deflecting motion to be performed by said manipulator is determined and controlled according to section energies to be introduced into the workpiece.

15. A laser device in accordance with claim 13, wherein said input unit has a keyboard and/or a drive for said portable data storage media and/or at least one interface for a data line.

16. A laser device in accordance with claim 12, further comprising: one or more tools for the workpiece, which are connected to said control, said one or more tools including clamping tools and/or a conveying means for conveying the workpiece.

17. A laser device in accordance with claim 9, wherein said guide means has a modular design and has a plurality of optic conductor sections that can be connected.

18. A laser device in accordance with claim 9, wherein said laser source is designed as a fiber laser, disk laser or diode-pumped Nd-YAG laser.

19. A laser device in accordance with claim 9, wherein said laser tool has a focal distance that may be switched from one focal distance to another focal distance or may be adjusted from one focal distance to another focal distance, and said common control adjusts the focal distance of the laser tool as a function of laser beam motion and the angle of incidence of the laser beam on the workpiece.

20. A laser device in accordance with claim 9, wherein said laser tool has a focal distance greater than 300 mm.

21. A laser device in accordance with claim 12, further comprising additional manipulators each with a laser tool, to provide a plurality of said manipulators and to provide a plurality of laser tools, wherein said laser source is a common laser source that is switched by said control to said laser tools.

22. A laser device in accordance with claim 9, wherein said manipulator is designed as a multiaxial industrial robot a comprising a six-axis articulated arm robot with said axes and said hand has three said rotatory hand axes.

23. A process for laser machining of a vehicle chassis workpiece or chassis parts workpiece, the process comprising the steps of:
providing a multi-axial manipulator with a multi-axis hand;
providing a variable power laser source;
providing a multi-axial manipulator and variable power laser source common control;
providing a laser tool connected to the multi-axis hand, the laser tool having a focal distance;
providing a laser guiding device;
guiding a laser beam from the laser source via the guiding device to the laser tool connected to the multi-axis hand;
guiding the multi-axis hand to guide the laser tool over the workpiece at a contactless spacing along a machining track, with the manipulator guiding the multi-axis hand in a displacing motion relative to the workpiece;
deflecting the laser beam by variable deflection angles with a deflection motion to vary an angle of incidence of the laser beam on the workpiece via a movement of the laser tool about one or more hand axes of the multi-axis hand;
controlling laser power of the laser beam emitted at the laser tool, with the common controller, as a function of said displacing motion and said deflection motion and of said angle of incidence of the laser beam on the workpiece.

24. A process in accordance with claim 23, wherein the focal distance may be switched from one focal distance to another focal distance or may be adjusted from one focal distance to another focal distance, and further comprising the step of:
adjusting the focal distance of the laser tool as a function of laser beam motion and the angle of incidence of the laser beam on the workpiece.

25. A laser device for laser machining of a vehicle chassis workpiece or chassis parts workpiece, the laser device comprising:
a multi-axial manipulator with a multi-axis hand;
a variable power laser source;
a laser tool connected to the multi-axis hand, the laser tool having a focal distance;
a laser guiding device connected between said variable power laser source and said laser tool for guiding a laser beam from said laser source to said laser tool;
a multi-axial manipulator and variable power laser source common control for controlling said manipulator for guiding the multi-axis hand to guide the laser tool over the workpiece at a contactless spacing along a machining track, with the manipulator guiding the multi-axis hand in a displacing motion relative to the workpiece, for deflecting the laser beam by variable deflection angles with a deflection motion to vary an angle of incidence of the laser beam on the workpiece via a movement of the laser tool about one or more hand axes of the multi-axis hand and for controlling laser power of the laser beam emitted at the laser tool, with the common controller, as a function of said displacing motion and said deflection motion and of said angle of incidence of the laser beam on the workpiece.

26. A laser device in accordance with claim 25, wherein said laser tool has a focal distance that may be switched from one focal distance to another focal distance or may be adjusted from one focal distance to another focal distance, and said common control adjusts the focal distance of the laser tool as a function of laser beam motion and the angle of incidence of the laser beam on the workpiece.

* * * * *